United States Patent
Chiu et al.

(10) Patent No.: US 11,502,508 B2
(45) Date of Patent: Nov. 15, 2022

(54) BATTERY SECONDARY PROTECTION CIRCUIT AND MODE SWITCHING METHOD THEREOF

(71) Applicant: uPI semiconductor corp., Zhubei (TW)

(72) Inventors: Chun-Kuei Chiu, Zhubei (TW); Chih-Liang Wu, Zhubei (TW); Shih-Kun Liang, Zhubei (TW)

(73) Assignee: UPI SEMICONDUCTOR CORP., Zhubei (TW)

( * ) Notice: Subject to any disclaimer, the term of this patent is extended or adjusted under 35 U.S.C. 154(b) by 52 days.

(21) Appl. No.: 17/341,440

(22) Filed: Jun. 8, 2021

(65) Prior Publication Data
US 2021/0399544 A1 Dec. 23, 2021

(30) Foreign Application Priority Data
Jun. 18, 2020 (CN) .......................... 202010558698.4

(51) Int. Cl.
*H02H 7/18* (2006.01)
*H02H 1/00* (2006.01)

(52) U.S. Cl.
CPC ............ *H02H 7/18* (2013.01); *H02H 1/0007* (2013.01)

(58) Field of Classification Search
CPC .. G01R 19/10; G01R 19/16576; G01R 31/54; H01M 10/425; H01M 10/48; H01M 2200/00; H01M 50/572; H02H 1/0007; H02H 1/04; H02H 3/202; H02H 5/10; H02H 7/18; H02J 7/0013; H02J 7/0014; H02J 7/0029; H02J 7/00308; H02J 7/0031; H02J 7/0047; Y02E 60/10
See application file for complete search history.

(56) References Cited

U.S. PATENT DOCUMENTS

| | | | |
|---|---|---|---|
| 5,914,586 A | 6/1999 | Fujita et al. | |
| 6,501,248 B2 | 12/2002 | Fujiwara | |
| 6,958,591 B1 | 10/2005 | Smith | |
| 7,667,435 B2 | 2/2010 | Denning | |
| 7,847,519 B2 | 12/2010 | Ho | |
| 10,978,867 B2 * | 4/2021 | Li | ....... G01R 31/3835 |
| 2010/0141219 A1 * | 6/2010 | Li | ....... H01M 10/441 361/91.1 |

(Continued)

FOREIGN PATENT DOCUMENTS

CN 104300509 B 3/2017

*Primary Examiner* — Jared Fureman
*Assistant Examiner* — Nicolas Bellido
(74) *Attorney, Agent, or Firm* — McClure, Qualey & Rodack, LLP (57) ABSTRACT

A battery secondary protection circuit and a mode switching method thereof are disclosed. The battery secondary protection circuit is coupled in series with a battery primary protection circuit and has a power pin and a sensing pin. The switching method includes steps of: (S1) determining whether a voltage difference between the power pin and the sensing pin is greater than a default value; and (S2) selectively switching the battery secondary protection circuit to a first mode or a second mode according to a determination result of the step (S1). The battery secondary protection circuit delays a first delay time and a second delay time in the first mode and the second mode respectively and then performs a circuit protection operation. The first delay time is longer than the second delay time.

13 Claims, 6 Drawing Sheets

(56) References Cited

U.S. PATENT DOCUMENTS

| | | | | |
|---|---|---|---|---|
| 2012/0280572 A1* | 11/2012 | Li | ................ | H02J 7/00308 |
| | | | | 307/77 |
| 2019/0326746 A1* | 10/2019 | Li | ................ | H01M 10/482 |
| 2022/0021230 A1* | 1/2022 | Chiu | ................ | G01R 31/54 |

* cited by examiner

FIG. 1 (PAIOR ART)

BATTERY SECONDARY PROTECTION CIRCUIT AND MODE SWITCHING METHOD THEREOF

BACKGROUND OF THE INVENTION

1. Field of the Invention

The invention relates to a battery protection circuit; in particular, to a battery secondary protection circuit and a mode switching method thereof.

2. Description of the Prior Art

In a general battery secondary protection circuit, once it detects that the battery is over-voltage, an over-voltage protection signal will be sent out to blown the fuse disposed on the power supply path to provide a one-time over-voltage protection.

Figure 1:
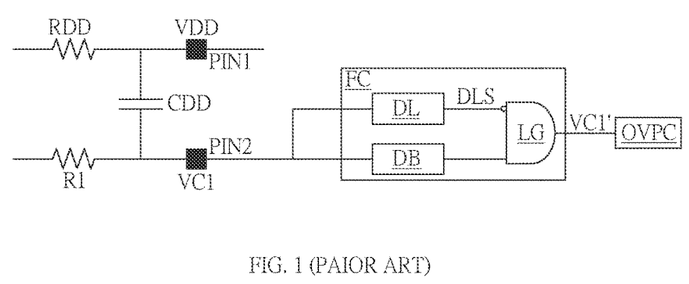
FIG. 1 is a schematic diagram of an over-voltage protection circuit in a battery secondary protection circuit in the prior art.

Please refer to FIG. 1. In order to prevent the noise generated during assembly or welding from falsely triggering the over-voltage protection function, the existing battery secondary protection circuit is not only equipped with the resistors RDD, R1 and the capacitor CDD in addition to the sensing pin PIN2, but also a filter circuit FC including a debounce circuit DB is disposed in front of the over-voltage protection circuit OVPC. When the debounce circuit DB detects the transition of the sensing signal VC1 inputted from the sensing pin PIN2, the debounce circuit DB will first lock the sensing signal VC1 and continue to filter out the noise and then output the filtered sensing Signal VC1'.

In order to reliably remove the influence of noise, the current filter circuit FC will additionally be provided with a delay unit DL to extend the continuous filtering time of the debounce circuit DB. However, if the extended continuous filtering time of the delay unit DL is too short (for example, 4 milliseconds), it is still impossible to completely prevent the noise generated in the assembly stage from falsely triggering the over-voltage protection function; if the delay unit DL greatly extends the continuous filtering time for this reason (for example, extended to 6 seconds), during the test phase, after each test is completed, it is necessary to wait for the end of the continuous filtering time to confirm the result, resulting in poor test efficiency.

The above-mentioned problems still need to be further resolved.

SUMMARY OF THE INVENTION

Therefore, the invention provides a battery secondary protection circuit and a mode switching method thereof to solve the above-mentioned problems in the prior art.

An embodiment of the invention is a mode switching method of a battery secondary protection circuit. In this embodiment, the battery secondary protection circuit is coupled in series with a battery primary protection circuit and has a power source pin and a sensing pin.

The mode switching method includes steps of: (S1) determining whether a voltage difference between the power source pin and the sensing pin is greater than a default value; and (S2) selectively switching the battery secondary protection circuit to a first mode or a second mode according to a determination result of the step (S1), wherein the battery secondary protection circuit delays a first default time and a second default time in the first mode and the second mode respectively and then performs a circuit protection operation, and the first default time is longer than the second default time.

In an embodiment of the invention, the first default time is longer than 100 times of the second default time.

In an embodiment of the invention, before the step (S1), the mode switching method future includes steps of: (S0) determining whether the battery secondary protection circuit is power-on for the first time.

In an embodiment of the invention, the step (S0) determining whether the battery secondary protection circuit is power-on for the first time according to a voltage value of the power source pin.

In an embodiment of the invention, if the determination result of the step (S0) is yes, then the step (S1) is performed. If the determination result of the step (S0) is no, then switches the battery secondary protection circuit to a third mode.

In an embodiment of the invention, if the determination result of the step (S1) is yes, then the step (S2) switches the battery secondary protection circuit to the second mode; if the determination result of the step (S1) is no, then the step (S2) switches the battery secondary protection circuit to the first mode.

Another embodiment of the invention is a battery secondary protection circuit. In this embodiment, the battery secondary protection circuit includes a power source pin, a sensing pin, a mode switching circuit and a protection circuit. The mode switching circuit is coupled to the power source pin and the sensing pin respectively and configured to determine whether a voltage difference between the power source pin and the sensing pin is larger than a default value to selectively provide a first time signal or a second time signal to switch the battery secondary protection circuit to a first mode or a second mode. The protection circuit is coupled to the mode switching circuit and configured to perform a circuit protection operation in the first mode and the second mode after delaying a first default time and a second default time respectively, and the first default time is longer than the second default time.

In an embodiment of the invention, the first default time is longer than 100 times of the second default time.

In an embodiment of the invention, when the voltage difference is larger than a default voltage, the mode switching circuit provides the second time signal.

In an embodiment of the invention, when the voltage difference is smaller than a default voltage, the mode switching circuit provides the first time signal.

In an embodiment of the invention, the protection circuit includes a stabilizing circuit. The stabilizing circuit is coupled to the sensing pin and configured to receive a sensing signal from the sensing pin and make the protection circuit to perform the circuit protection operation after the first default time and the second default time.

In an embodiment of the invention, the first time signal corresponds to the first mode and the second time signal corresponds to the second mode.

In an embodiment of the invention, the mode switching circuit includes a comparison circuit, a first time circuit, a second time circuit and a switching circuit. The comparison circuit is coupled to the power source pin and the sensing pin respectively and configured to obtain the voltage difference according to a voltage of the power source pin and a voltage of the sensing pin. The first time circuit is configured to provide the first time signal. The second time circuit is configured to provide the second time signal. The switching circuit is configured to selectively turn on the first time circuit or the second time circuit to selectively provide the first time signal or the second time signal.

Compared to the prior art, the battery secondary protection circuit and its mode switching method of the invention can switch its modes in response to different requirements of assembly and testing, so as to provide default times suitable for assembly and testing (for example, 60 seconds and 4 milliseconds). It can effectively prevent assembly noise from falsely starting the over-voltage protection function and can greatly shorten the test time to improve the test efficiency.

The advantage and spirit of the invention may be understood by the following detailed descriptions together with the appended drawings.

DETAILED DESCRIPTION OF THE INVENTION

Exemplary embodiments of the invention are referenced in detail now, and examples of the exemplary embodiments are illustrated in the drawings. Further, the same or similar reference numerals of the components/components in the drawings and the detailed description of the invention are used on behalf of the same or similar parts.

An embodiment according to the invention is a battery secondary protection circuit. In this embodiment, the battery secondary protection circuit is coupled in series with a battery primary protection circuit and a fuse and used to provide a one-time over-voltage protection.

Figure 2:
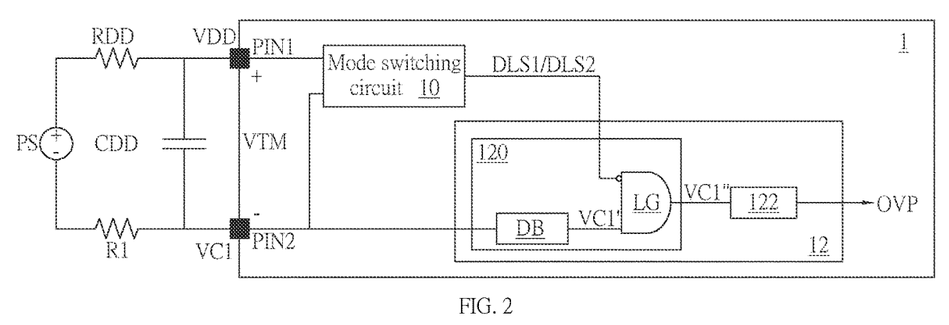
FIG. 2 is a schematic diagram of a battery secondary protection circuit switching mode in an embodiment of the invention.

Please refer to FIG. 2, the battery secondary protection circuit 1 includes a power source pin PIN1, a sensing pin PIN2, a mode switching circuit 10 and a protection circuit 12. The power source pin PIN1 is coupled in series with a resistor RDD. The sensing pin PIN2 is coupled in series with the resistor R1. One terminal of the capacitor CDD is coupled between the power source pin PIN1 and the resistor RDD, and the other terminal of the capacitor CDD is coupled between the sensing pin PIN2 and the resistor R1. During the test, a positive electrode + and a negative electrode − of an external power source PS are coupled to the resistance RDD and the resistance R1 respectively to generate a voltage difference VTM between the power source pin PIN1 and the sensing pin PIN2.

The resistors RDD, R1 and the capacitor CDD form a filter circuit disposed out of the battery secondary protection circuit 1, and the battery secondary protection circuit 1 can include one or more sensing pins, but not limited to this.

As shown in FIG. 2, the power source pin PIN1 is coupled to the mode switching circuit 10. The sensing pin PIN2 is coupled to the mode switching circuit 10 and the protection circuit 12 respectively. The mode switching circuit 10 is coupled to the power source pin PIN1, the sensing pin PIN2 and the protection circuit 12 respectively.

The mode switching circuit 10 selectively provides a first time signal DLS1 or a second time signal DLS2 to the protection circuit 12 according to the voltage difference VTM between the power source pin PIN1 and the sensing pin PIN2. If the voltages of the power source pin PIN1 and the sensing pin PIN2 are VDD and VC1 respectively, the voltage difference VTM between the power source pin PIN1 and the sensing pin PIN2 is (VDD−VC1).

In an embodiment, the mode switching circuit 10 can determine whether it provides the first time signal DLS1 or the second time signal DLS2 to the protection circuit 12 according to whether the voltage difference VTM between the power source pin PIN1 and the sensing pin PIN2 is greater than a default voltage.

For example, when the voltage difference VTM between the power source pin PIN1 and the sensing pin PIN2 is less than the default voltage (for example, 4 volts), the mode switching circuit 10 provides the first time signal DLS1 to the protection circuit 12. When the voltage difference VTM between the power source pin PIN1 and the sensing pin PIN2 is greater than the default voltage (for example, 4 volts), the mode switching circuit 10 provides the second time signal DLS2 to the protection circuit 12.

When the protection circuit 12 receives the first time signal DLS1 or the second time signal DLS2, the protection circuit 12 will perform circuit protection operations according to the first time signal DLS1 or the second time signal DLS2.

In an embodiment, the protection circuit 12 includes a delay circuit 120 and an over-voltage protection circuit 122. The delay circuit 120 is coupled to the sensing pin PIN2, the mode switching circuit 10 and the overvoltage protection circuit 122 respectively. The over-voltage protection circuit 122 is coupled to the delay circuit 120.

The delay circuit 120 is used for receiving the sensing signal VC1 from the sensing pin PIN2 and selectively delaying the first default time or the second default time according to the first time signal DLS1 or the second time signal DLS2 provided by the mode switching circuit 10, and then outputting the filtered sensing signal VC1" to the over-voltage protection circuit 122. When the over-voltage protection circuit 122 receives the filtered sensing signal VC1", the over-voltage protection circuit 122 outputs an over-voltage protection signal OVP to start the over-voltage protection operation.

In practical applications, the first default time corresponding to the first time signal DLS1 will be longer than 100 times of the second default time corresponding to the second time signal DLS2; for example, if the first default time corresponding to the first time signal DLS1 is 60 seconds and the second default time corresponding to the second time signal DLS2 is 4 milliseconds, the former is 15000 times of the latter, but not limited to this.

As shown in FIG. 2, the delay circuit 120 can include a filter circuit DB and a logic circuit LG. The filter circuit DB is coupled to the sensing pin PIN2 for receiving the sensing signal VC1 and outputting the filtered sensing signal VC1' to the logic circuit LG after a period of default time. The logic circuit LG is coupled to the mode switching circuit 10, the filter circuit DB, and the over-voltage protection circuit 122 respectively for selectively delaying the first default time or the second default time according to the first time signal DLS1 or the second time signal DLS2, and then outputting the filtered sensing signal VC1" to the over-voltage protection circuit 122. In this embodiment, the filter circuit can be a debouncer, a timer, a filter and a signal shielding circuit or a combination thereof, and the logic circuit LG is an AND gate, but not limited to this.

Figure 3:
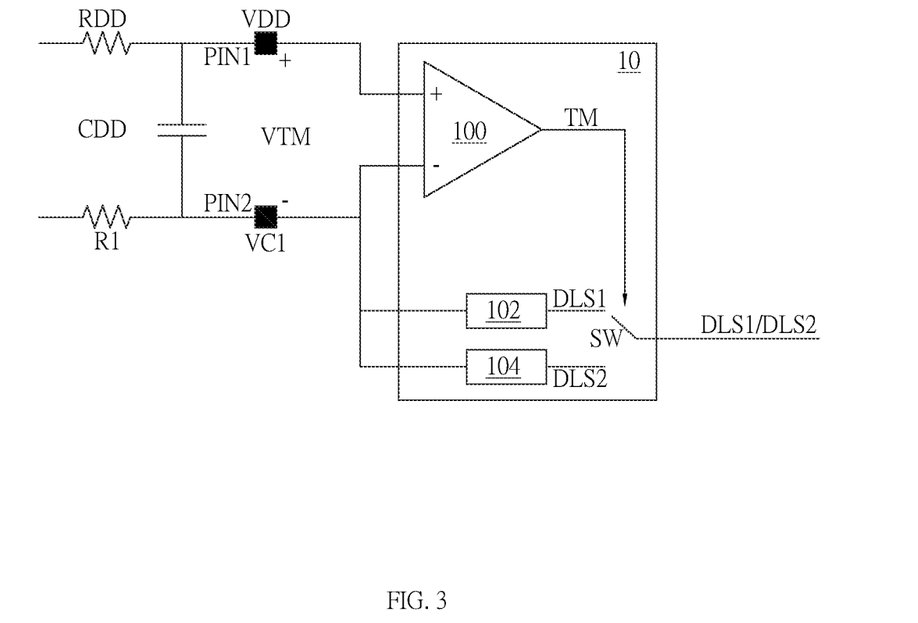
FIG. 3 is an embodiment of a mode switching circuit in FIG. 2.

Please refer to FIG. 3, in an embodiment, the mode switching circuit 10 can include a comparison circuit 100, a first time circuit 102, a second time circuit 104 and a switching circuit SW. Two input terminals + and − of the comparison circuit 100 are coupled to the power source pin PIN1 and the sensing pin PIN2 respectively for receiving the voltage VDD of the power source pin PIN1 and the voltage VC1 of the sensing pin PIN2, and generating a voltage difference VTM according to the voltage VDD of the power source pin of PIN1 and the voltage VC1 of the sensing pin PIN2 and then outputting the voltage difference VTM to the switching circuit SW. The first time circuit 102 is used to generate the first time signal DLS1. The second timing circuit 104 is used to generate the second timing signal DLS2. The switching circuit SW is used for selectively coupling the first time circuit 102 or the second time circuit 104 according to the voltage difference VTM to selectively provide the first time signal DLS1 or the second time signal DLS2.

Figure 4:
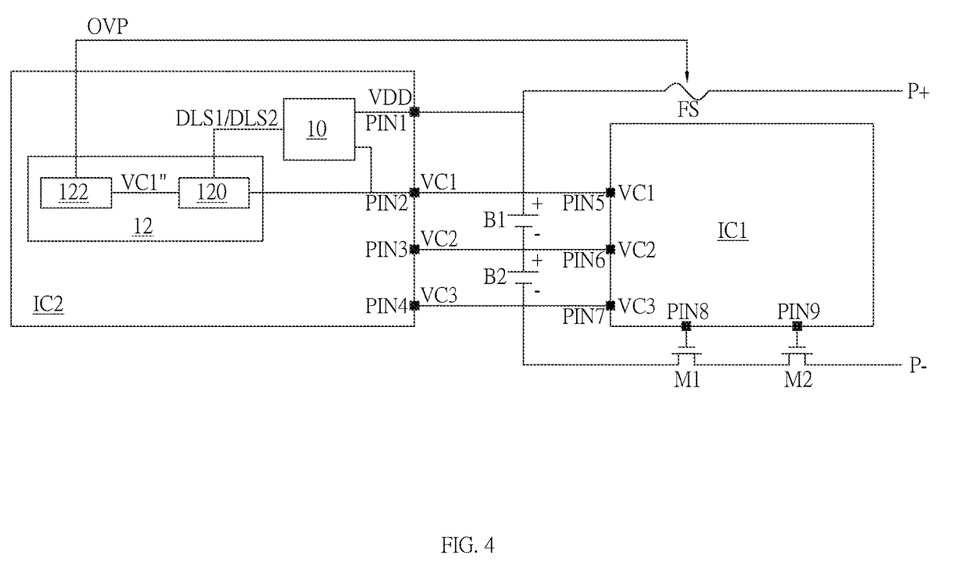
FIG. 4 is a schematic diagram of the battery secondary protection circuit coupled in series with the battery primary protection circuit to provide battery over-voltage protection function.

Please refer to FIG. 4. FIG. 4 is a schematic diagram of the battery secondary protection circuit IC2 and the battery primary protection circuit IC1 coupled in series and operated in the third mode (the work mode) to provide battery over-voltage protection.

As shown in FIG. 4, the battery secondary protection circuit IC2 includes a power source pin PIN1, a sensing pin PIN2~PIN4, a mode switching circuit 10 and a protection circuit 12.

The power source pin PIN1 and the sensing pin PIN2 are short-circuited. The battery primary protection circuit IC1 includes pins PIN5~PIN9.

In the battery secondary protection circuit IC2, the protection circuit 12 includes a delay circuit 120 and an over-voltage protection circuit 122. The power source pin PIN1 is coupled to the mode switching circuit 10 and the fuse FS respectively. The sensing pin PIN2 is coupled to the mode switching circuit 10, the delay circuit 120 and the high voltage terminal + of the battery unit B1 respectively, and the sensing pin PIN2 is shorted with the power source pin PIN1. The sensing pin PIN3 is coupled to the low-voltage terminal − of the battery cell B1 and the high-voltage terminal + of the battery cell B2. The sensing pin PIN4 is coupled to the low-voltage terminal − of the battery unit B2. The mode switching circuit 10 is coupled to the power source pin PIN1, the sensing pin PIN2 and the delay circuit 120 respectively. The delay circuit 120 is coupled to the mode switching circuit 10, the sensing pin PIN2 and the over-voltage protection circuit 122 respectively. The over-voltage protection circuit 122 is coupled to the delay circuit 120 and the fuse FS respectively.

In the battery primary protection circuit IC1, the pins PIN5~PIN7 are coupled to the high-voltage terminal + and the low-voltage terminal − of the battery units B1 and B2 respectively. The pins PIN8~PIN9 are coupled to the control terminals of the protection switches M1-M2 respectively. The protection switches M1 and M2 are coupled in series with the negative electrode − of the battery B2. The battery units B1 and B2 are coupled in series with each other. The positive electrode + of the battery unit B1 is coupled to the fuse FS.

Since the power source pin PIN1 and the sensing pin PIN2 are shorted, the voltage difference (VDD−VC1) between the pins is less than the default voltage (for example, 4 volts). When the voltage VDD of the pin PIN1 of the battery secondary protection circuit IC2 starts to climb from 0V, it represents power-on for the first time. At this time, the mode switching circuit 10 provides the first time signal DLS1 to the delay circuit 120 of the protection circuit 12 according to the voltage difference (VDD−VC1), so that the battery secondary protection circuit IC2 operates in the sleep mode first. The delay circuit 120 filters the sensing signal VC1 received from the sensing pin PIN2, delays a first default time according to the first time signal DLS1, and then outputs the filtered sensing signal VC1" to the over-voltage protection circuit 122. When the over-voltage protection circuit 122 receives the filtered sensing signal VC1", the over-voltage protection circuit 122 outputs the over-voltage protection signal OVP to blown the fuse FS disposed on the power source path of the battery units B1~B2 to provide a one-time over-voltage protection.

Figure 5:
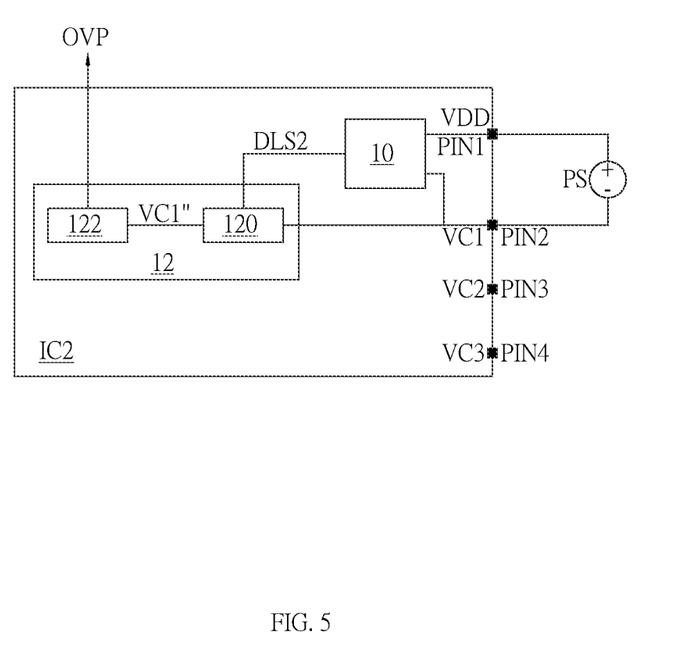
FIG. 5 is a schematic diagram of the pin coupling state of the battery secondary protection circuit which is switched to the second mode.

Please refer to FIG. 5. FIG. 5 is a schematic diagram of the pin coupling state of the battery secondary protection circuit IC2 in the test mode.

As shown in FIG. 5, the power source pin PIN1 and the sensing pin PIN2 of the battery secondary protection circuit IC2 are coupled to the positive electrode + and the negative electrode − of the power source PS respectively. In other words, the voltage difference VTM between the power source pin PIN1 and the sensing pin PIN2 is the voltage provided by the power source PS.

In the test mode, the voltage provided by the power source PS is greater than a default voltage (for example, 4 volts), so that the mode switching circuit 10 provides the second time signal DLS2 to the delay circuit 120 of the protection circuit 12 according to the voltage difference VTM. The delay circuit 120 filters the sensing signal VC1 received from the sensing pin PIN2, and delays a second default time (for example, 4 milliseconds) according to the second time signal DLS2, and then outputs the filtered sensing signal VC1" to the over-voltage protection circuit 122. When the over-voltage protection circuit 122 receives the filtered sensing signal VC1', the over-voltage protection circuit 122 outputs an over-voltage protection signal OVP.

Figure 6A:
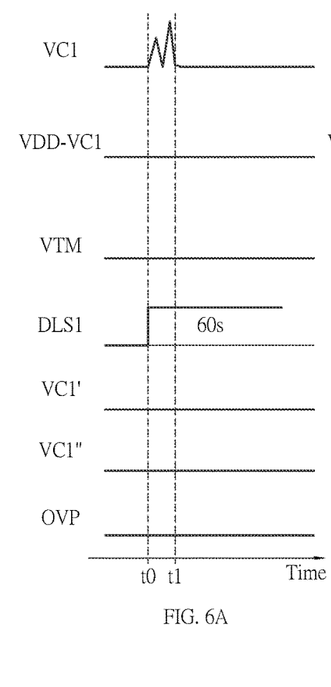
FIG. 6A-FIG. 6C are waveform timing diagrams of the battery secondary protection circuit operated in the sleep mode, the test mode and the work mode.
Figure 6B:
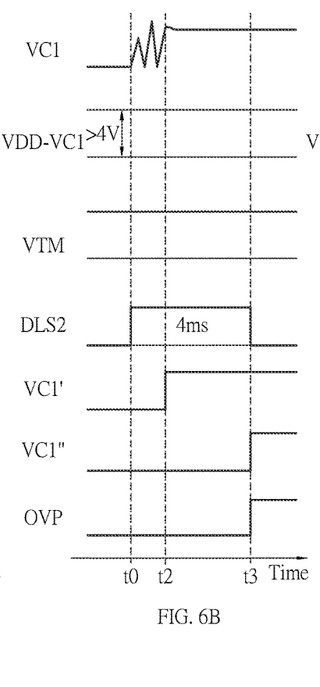
Figure 6C:
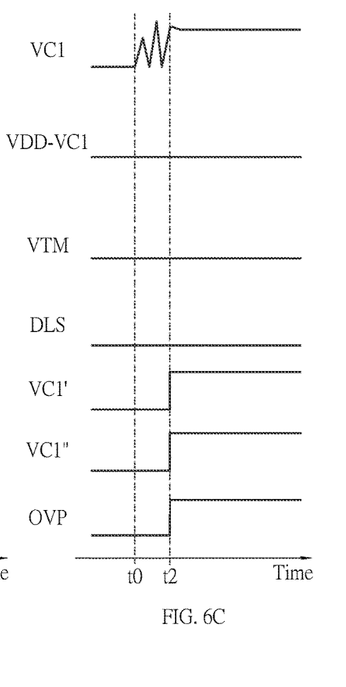

Please refer to FIG. 6A, FIG. 6B and FIG. 6C. FIG. 6A, FIG. 6B and FIG. 6C are waveform timing diagrams of the battery secondary protection circuit in the sleep mode, the test mode and the work mode respectively.

As shown in FIG. 4 and FIG. 6A, at the time t0, since the power source pin PIN1 and the sensing pin PIN2 are shorted, the voltage difference VTM is less than the default voltage (for example, 4 volts). Therefore, the comparison circuit 100 in FIG. 3 outputs the switching signal TM which is maintained at low-level, so that the switching circuit SW to turn on the first time circuit 102, thereby providing the first time signal DLS1 (with a default time of 60 seconds) to the delay circuit 120 in the protection circuit 12 to operate in the sleep mode to meet assembly requirements.

During this default time, the delay circuit 120 will not output the filtered sensing signal VC1", so its waveform is maintained at low-level. Similarly, during this period of default time, since the over-voltage protection circuit 122 has not yet received the filtered sensing signal VC1", the over-voltage protection circuit 122 also does not output the over-voltage protection signal OVP, so its waveform is maintained at low-level.

As shown in FIG. 5 and FIG. 6B, at the time t0, since the voltage difference VTM between the power source pin PIN1 and the sensing pin PIN2 is greater than the default voltage (for example, 4 volts), the comparison circuit 100 in FIG. 3 outputs the switching signal TM which is maintained at high-level, so that the switching circuit SW and the second timing circuit 104 are turned on to provide the second timing signal DLS2 (with a default time of 4 milliseconds) to the delay circuit 120 in the protection circuit 12 to operate in the test mode that meets the test requirements.

During this period of default time (the time t0 to the time t3), the delay circuit 120 will not output the filtered sensing signal VC1", so its waveform is maintained at low-level until the filtered sensing signal VC1" is outputted at the time t3 to make its waveform become high-level. Similarly, during the default time (the time t0 to the time t3), since the over-voltage protection circuit 122 has not received the filtered sensing signal VC1", the over-voltage protection circuit 122 will not output the over-voltage protection signal OVP, so that its waveform is maintained at low-level until the over-voltage protection circuit 122 receives the filtered sensing signal VC1" at the time t3 and outputs the over-voltage protection signal OVP to make its waveform become high-level.

It should be noted that when the battery secondary protection circuit is produced, the first time signal DLS1 (with a default time of 60 seconds) generated by the first time circuit 102 or the second time signal DLS2 (with a default time of 4 milliseconds) generated by the circuit 104 can be set as a default signal source through the laser trim technology to meet different needs of customers, but not limited to this.

When the battery secondary protection circuit is used, the power source pin PIN1 and the sensing pin PIN2 are shorted, so that the mode switching circuit 10 is always in a default state, and it is only started once each time the battery secondary protection circuit is powered on for the first time (for example, when the battery is replaced), and then it is in the work mode when it continues to be powered on. As shown in FIG. 6C, the time signal DLS outputted by the mode switching circuit 10 will continue to be at low-level, so the time for the delay circuit 120 to filter the sensing signal VC1 is the continuous filtering time of the stabilizing circuit DB itself without extending the continuous filtering time, but not limited to this. During the time t0 to the time t2, the stabilizing circuit DB continues to filter, and the delay circuit 120 will not output the filtered sensing signal VC1", so its waveform is maintained at low-level until the filtered sensing signal VC1" is outputted at the time t2 to make its waveform become high-level. Similarly, during the time t0 to the time t2, since the over-voltage protection circuit 122 has not received the filtered sensing signal VC1", the over-voltage protection circuit 122 will not output the over-voltage protection signal OVP, so its waveform remains at low-level until the over-voltage protection circuit 122 receives the filtered sensing signal VC1" at the time t2 and outputs the over-voltage protection signal OVP to make its waveform become high-level.

Another embodiment according to the invention is a mode switching method of a battery secondary protection circuit. In this embodiment, the battery secondary protection circuit is coupled in series with the battery primary protection circuit and has a power source pin and a sensing pin, but not limited to this.

Figure 7:
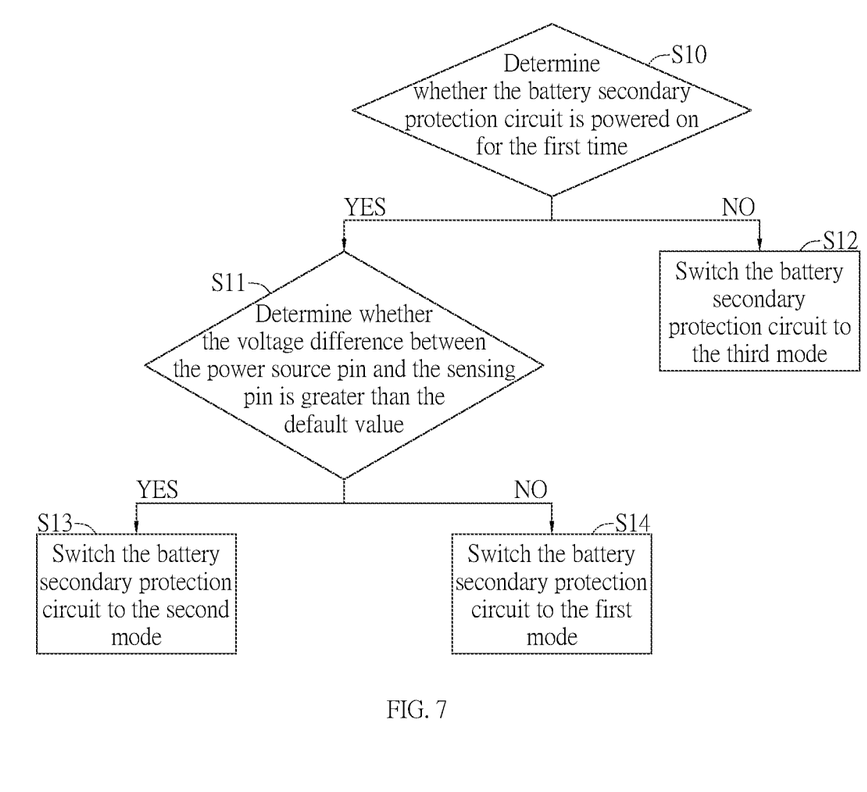
FIG. 7 is a flowchart of the mode switching method of the battery secondary protection circuit in another embodiment of the invention.

Please refer to FIG. 7. FIG. 7 is a flowchart of the mode switching method of the battery secondary protection circuit in this embodiment.

As shown in FIG. 7, the mode switching method in this embodiment includes the following steps:

step S10: determine whether the battery secondary protection circuit is powered on for the first time;

if the determination result of the step S10 is yes, then the step S11 is performed to determine whether the voltage difference between the power source pin and the sensing pin is greater than the default value;

if the determination result of the step S10 is no, then the step S12 is performed to switch the battery secondary protection circuit to the third mode;

if the determination result of the step S11 is yes, then the step S13 is performed to switch the battery secondary protection circuit to the second mode; and if the determination result of the step S11 is no, then the step S14 is performed to switch the battery secondary protection circuit to the first mode.

In practical applications, the step S10 can determine whether the battery secondary protection circuit is powered on for the first time according to the voltage value of the power source pin, but not limited to this.

When the step S14 switches the battery secondary protection circuit to the first mode (the sleep mode), the battery secondary protection circuit will delay the first default time and then transmit the sensing signal to the over-voltage protection circuit; when the step S13 switches the battery secondary protection circuit into the second mode (the test mode), the battery secondary protection circuit will delay the second default time and then transmit the sensing signal to the over-voltage protection circuit.

It should be noted that the first default time in the first mode (the sleep mode) of the battery secondary protection circuit of the invention is longer than the second default time in the second mode (the test mode), and preferably, the first default time is greater than 100 times of the second default time; for example, when the first default time is 60 seconds and the second default time is 4 milliseconds, the first time is 15000 times of the second default time, but not limited to this.

In an embodiment, when the step S12 switches the battery secondary protection circuit to the third mode (the work mode), the default time of the battery secondary protection circuit in the third mode (the work mode) is shorter than the second default time (for example, 1 millisecond), and of course much shorter than the first default time, but not limited to this. In another embodiment, the battery secondary protection circuit can be operated in the third mode (the work mode) without any delay, but not limited to this.

Compared to the prior art, the battery secondary protection circuit and its mode switching method of the invention can switch its modes in response to different requirements of assembly and testing, so as to provide default times suitable for assembly and testing (for example, 60 seconds and 4 milliseconds). It can effectively prevent assembly noise from falsely starting the over-voltage protection function and can greatly shorten the test time to improve the test efficiency.

What is claimed is:

1. A mode switching method of a battery secondary protection circuit, the battery secondary protection circuit being coupled in series with a battery primary protection circuit and having a power source pin and a sensing pin, the mode switching method comprising steps of:

(S1) determining whether a voltage difference between the power source pin and the sensing pin is greater than a default value; and (S2) selectively switching the battery secondary protection circuit to a first mode or a second mode according to a determination result of the step (S1), wherein the battery secondary protection circuit delays a first default time and a second default time in the first mode and the second mode respectively and then performs a circuit protection operation, and the first default time is longer than the second default time.

2. The mode switching method of claim 1, wherein the first default time is longer than 100 times of the second default time.

3. The mode switching method of claim 1, wherein before the step (S1), the mode switching method future comprising steps of:

(S0) determining whether the battery secondary protection circuit is power-on for the first time.

4. The mode switching method of claim 3, wherein the step (S0) determining whether the battery secondary protection circuit is power-on for the first time according to a voltage value of the power source pin.

5. The mode switching method of claim 3, wherein if the determination result of the step (S0) is yes, then the step (S1) is performed; if the determination result of the step (S0) is no, then switches the battery secondary protection circuit to a third mode.

6. The mode switching method of claim 1, wherein if the determination result of the step (S1) is yes, then the step (S2) switches the battery secondary protection circuit to the second mode; if the determination result of the step (S1) is no, then the step (S2) switches the battery secondary protection circuit to the first mode.

7. A battery secondary protection circuit, comprising:
a power source pin;
a sensing pin;
a mode switching circuit, coupled to the power source pin and the sensing pin respectively and configured to determine whether a voltage difference between the power source pin and the sensing pin is larger than a default value to selectively provide a first time signal or a second time signal to switch the battery secondary protection circuit to a first mode or a second mode; and
a protection circuit, coupled to the mode switching circuit and configured to perform a circuit protection operation in the first mode and the second mode after delaying a first default time and a second default time respectively, and the first default time is longer than the second default time.

8. The battery secondary protection circuit of claim 7, wherein the first default time is longer than 100 times of the second default time.

9. The battery secondary protection circuit of claim 7, wherein when the voltage difference is larger than a default voltage, the mode switching circuit provides the second time signal.

10. The battery secondary protection circuit of claim 7, wherein when the voltage difference is smaller than a default voltage, the mode switching circuit provides the first time signal.

11. The battery secondary protection circuit of claim 7, wherein the protection circuit comprises:
a stabilizing circuit, coupled to the sensing pin and configured to receive a sensing signal from the sensing pin and make the protection circuit to perform the circuit protection operation after the first default time and the second default time.

12. The battery secondary protection circuit of claim 7, wherein the first time signal corresponds to the first mode and the second time signal corresponds to the second mode.

13. The battery secondary protection circuit of claim 7, wherein the mode switching circuit comprises:
a comparison circuit, coupled to the power source pin and the sensing pin respectively and configured to obtain the voltage difference according to a voltage of the power source pin and a voltage of the sensing pin;
a first time circuit, configured to provide the first time signal;
a second time circuit, configured to provide the second time signal; and
a switching circuit, configured to selectively turn on the first time circuit or the second time circuit to selectively provide the first time signal or the second time signal.

* * * * *